United States Patent [19]

Espedalen

[11] 4,349,060

[45] Sep. 14, 1982

[54] MEANS FOR IMPROVING THE SURFACE GRIP OF A TIRE OF A VEHICLE AND A METHOD FOR MANUFACTURING SUCH MEANS

[75] Inventor: Kare Espedalen, Stavern, Norway

[73] Assignee: Elkem A/S, Oslo, Norway

[21] Appl. No.: 241,595

[22] Filed: Mar. 9, 1981

[30] Foreign Application Priority Data

Mar. 19, 1980 [NO] Norway ............................. 800788

[51] Int. Cl.³ .......................................... B60C 27/00
[52] U.S. Cl. ...................................... 152/172; 59/31; 59/34; 152/240; 152/242; 152/243; D12/154
[58] Field of Search .............. 152/171, 172, 173, 175, 152/239, 240, 243, 244, 231, 241, 242, 245, 208; 59/31, 34; D12/154

[56] References Cited

U.S. PATENT DOCUMENTS

| | | | |
|---|---|---|---|
| 1,901,213 | 3/1933 | Wells | 59/31 |
| 2,433,545 | 12/1947 | Chartier | 152/243 |
| 3,603,371 | 9/1971 | Muller | 152/239 |

*Primary Examiner*—Edward C. Kimlin
*Assistant Examiner*—Thomas Bokan
*Attorney, Agent, or Firm*—Eyre, Mann, Lucas & Just

[57] ABSTRACT

The present invention relates to an anti-skid device for improving the traction of a wheel on an automotive vehicle on the ground. The invention relates also to a method of producing such anti-skid devices. The anti-skid device comprises at least one chain intended to run along the wall(s) of the tire and a plurality of chains intended to surround the entire tread face of the tire. The various chains are interconnected. The interconnection is provided by welding a certain number of neighboring links of two adjacent chain lengths together. The chain length may preferably be equipped with additional gripping elements welded on at least some of the links.

7 Claims, 7 Drawing Figures

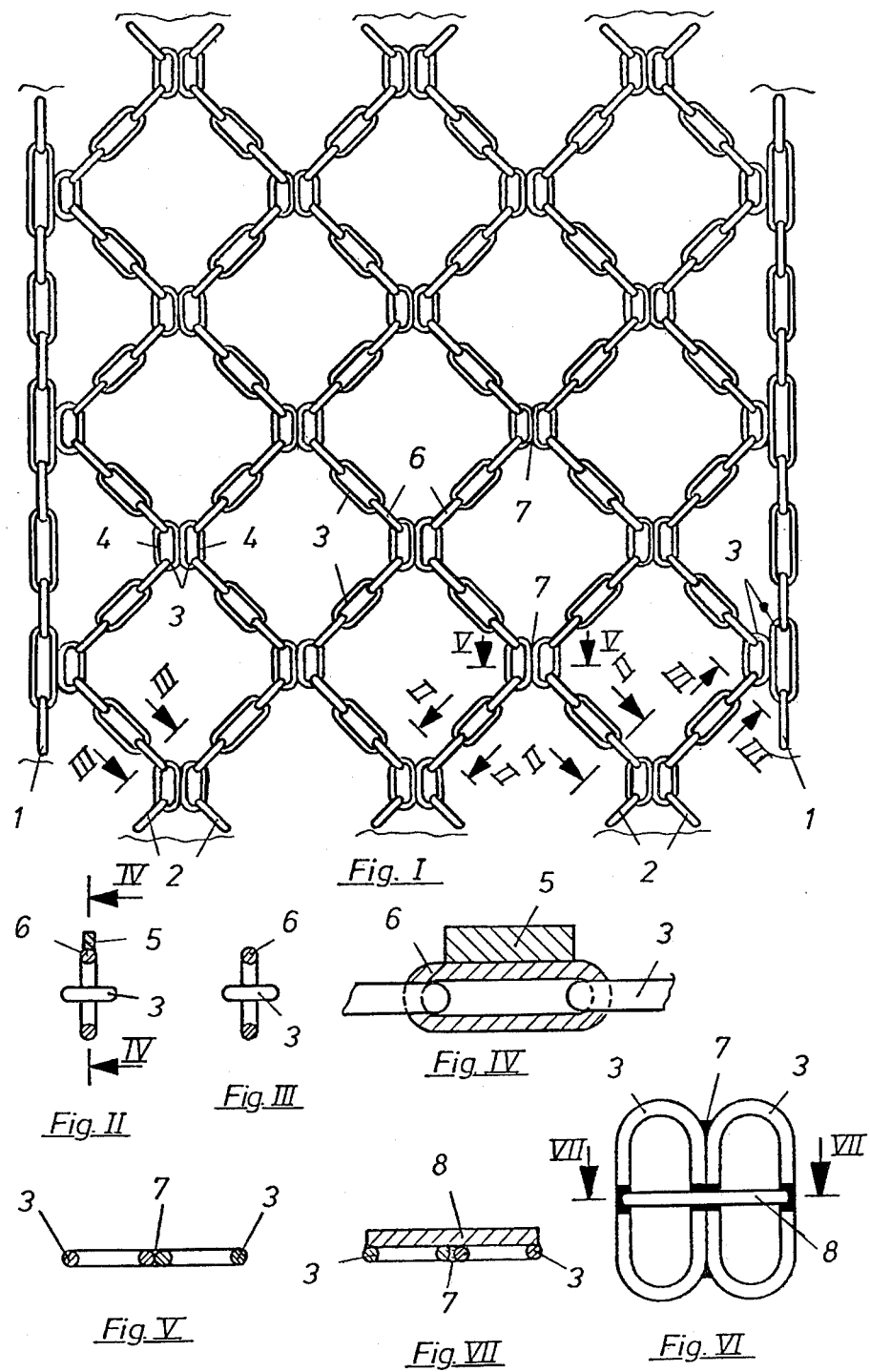

MEANS FOR IMPROVING THE SURFACE GRIP OF A TIRE OF A VEHICLE AND A METHOD FOR MANUFACTURING SUCH MEANS

The present invention relates to an anti-skid device for improving the surface grip of a wheel of a vehicle, preventing the vehicle from skidding on a slippery surface. The present invention relates further to a method for manufacturing such anti-skid device. The anti-skid device according to the present invention is particularly adapted to pneumatic tires of automotive vehicles and is intended to surround the entire tread face of the tire. The anti-skid device comprises a plurality of chains which are arranged in substantially parallel approximately zig-zag shaped strands extending longitudinally along the circumference of the tread surface of the tire. The chains are interlinked and linked with supporting side chains running along the inner and outer walls of the tire, supporting the anti-skid device on the wheel. The method of manufacturing the anti-skid device comprises production of a plurality of chain lengths, alternatively mounting additional gripping devices on one side of the chains, whereafter the chains are interconnected. More particularly, but not exclusively, the anti-skid device comprises chain elements which are particularly suited for use on heavy duty vehicles for forestry, mining and construction works etc.

For anti-skid devices of this type a simple and economical solution from a manufacturing point of view is required, providing sufficient positive engagement between the wheel and the ground surface. Further, sufficient resistance to lateral skidding is required. It should further be appreciated that a solution providing a minimum of metal loss due to splitting of links during the assembly operation is required.

It has previously been proposed to use anti-skid devices formed of chains and arranged in circumferential direction of a wheel to improve the traction of the tire. Two supporting side chains running on each of the tire, supporting transverse or longitudinally arranged chains, are commonly used. It has further been proposed to interconnect the longitudinally arranged chains by a U-shaped element which is inserted into two adjacent links of the adjacent chains. Upon introduction of the U-shaped link a yoke is welded to the two free ends of the U-shaped link, thereby securing the position of the two links. According to such a solution, the free end of each leg of the U-shaped link serves as an additional gripping element.

Such type of anti-skid devices provide a minimum of resistance against lateral skidding of the wheel. Further, it should be appreciated that the production of such type of anti-skid devices is dependent upon several complicated and time consuming operations such as inserting the U-shaped links into the links of two adjacent chains and subsequently clamp both the two links, the U-shaped interconnecting link and the yoke when welding the yoke to the legs of the U-shaped link. Such method of production is thus both unpractical and expensive.

The present invention provides an anti-skid device which is particularly adapted for continuous and automatic mass production, in which the required number of steps during assembly is reduced to a minimum. This is achieved by arranging the adjacent chains in a zig-zag pattern on an assembly line and welding the required number of adjacent links together. The length of each chain is adjusted to the length of the circumference of the particular wheel for which the anti-skid device is designed, taking into consideration the additional lengths due to the zig-zag pattern. The chains are preferably assembled on a particularly designed mounting jig in the desired pattern. A limited number of adjacent links of two neighbouring chains are then permanently interlinked by means of welding whereafter the entire anti-skid device upon completion is hardened in any conventional manner. Additional gripping devices may be welded to the individual links of the chains and to the interconnected pair of links. In the latter case the gripping devices serve the additional purpose of reinforcing the permanent interconnection between the links. In the former case, the gripping devices are preferably welded to one of the two parallel, straight portions of the link, the gripping device being arranged on the side which is intended to be in contact with the ground. The welding of the gripping devices is preferably performed prior to the mounting of the chain(s) on the assembly jig. Each chain length is preferably given a length which corresponds to the required zig-zag pattern.

The anti-skid device will, due to the zig-zag pattern of the chains and due to the particular arrangement of the gripping devices provide increased lateral stability during traction of the vehicle. This is mainly due to the fact that the gripping device is arranged in an inclined position relative to the direction of travel of the wheel(s), providing a substantial frictional area both in lateral direction of and in the direction of travel of the wheel. From a production point of view it is further a substantial advantage to weld the gripping devices on the links by means of an automatic welding machine prior to the assembly of the anti-skid device. It should further be appreciated that the assembly of the anti-skid device may be automatized to a large extent since the chain lengths may be assembled on a jig where at least three pair of links may be welded together simultaneously.

By letting the chains extend in the direction of the circumference of the wheel, providing a continuous, longitudinally extending chain pattern, the loss of material due to cutting several chain lengths from a continuous, long chain is reduced to a minimum, mainly since the required number of splitted links is substantially reduced. Further, the additional gripping elements may be welded to the links prior to the cutting of the chain into several chain length, for example by means of an automatic welding machine.

It should further be appreciated that the anti-skid device according to the present invention provides protection of the tread face of the tire.

The novel features which are considered as characteristic for the invention are set forth in particular in the appended claims. The invention itself, however, both as to its construction and its method of production, together with additional objects and advantages will be best understood from the following description of a specific embodiment when read in connection with the accompanying drawings, in which:

FIG. I shows a section of an anti-skid device in full width, in accordance with the present invention;

FIG. II shows a vertical section through a vertical link seen along line II—II on FIG. I; the link being provided with an additional gripping element;

FIG. III shows a vertical section through a vertical link without an additional gripping element, seen along the line III—III on FIG. I;

FIG. IV shows a vertical longitudinal section through the link shown on FIG. II, seen along the line IV—IV;

FIG. V shows a vertical section through a pair of interwelded links seen along line VV on FIG. I;

FIG. VI shows a horizontal elevation of two interconnected links of two adjacent chain lengths, the interconnected pair being provided with a transversely arranged gripping element welded on to the two links; and FIG. VII shows a vertical section through the linked pair seen along line VII—VII on FIG. VI.

FIG. I shows in full width a section of an anti-skid device in accordance with the present invention. The anti-skid device comprises two externally arranged support chains 1 which, when the anti-skid device is in a fitted position on a wheel, run along the inner and outer walls of the tire. The anti-skid device shown on FIG. I comprises further six centrally arranged chain lengths 2 which are intended to extend in a substantial longitudinal direction along the entire tread surface of the tire. The six chain lengths 2 are interconnected and further linked with the two peripherally arranged support chains 1, for example by means of welding. Every fourth chain link 3 on adjacent chain lengths 2 are interconnected, providing a zig-zag pattern. According to the present invention each chain length 2 is given a length which exceed the peripheral length of the tire, whereby a pattern for example as shown on FIG. I may be obtained. According to the embodiment shown on FIG. I the links of the chains 2 and 1 are welded together along the parallel portions 4 of each link 3. As shown on the Figures at least some of the vertical links 6 of at least one of the centrally arranged chain lengths 2 are provided with gripping elements 5 (cfr. FIG. II) welded to the vertical links 6.

FIG. II shows a vertical section through a vertical link 6 seen along line II—II on FIG. I. The vertical link 6 is on the side intended to be on contact with the ground, equipped with a gripping element 5 welded to the link. The reference number 3 denotes a horizontal link.

FIG. III shows a vertical section through a vertical link 6 which is not equipped with a gripping element 5, while FIG. IV shows a vertical, longitudinal section through the vertical link 6 shown on FIG. II, the section is seen along line IV—IV on FIG. II.

FIG. V shows a vertical section through two horizontal links 3 welded together, the section is seen along line V—V on FIG. I. The links 3 are welded together along their common line of contact 7.

In the following one preferred mode of production of an anti-skid device in accordance to the present invention will be described in more details.

The gripping elements 5 are firstly welded in required position on the vertical links of a long, preferably continuous chain line. The welding operation may for example be performed by an automatic welding machine, the chain being continuously fed into the welding machine. The chain is then cut into required chain sections 1, 2, the length of which being adjusted to the zig-zag pattern and the peripheral length of the particular tire for which the anti-skid device is designed. The chain lengths 1, 2 are then assembled and arranged in the required pattern on an assembly jig where horizontal links 3 on adjacent chain lengths 1, 2 are welded together for example as shown on FIG. I. The supporting peripheral chains 1 are rigidly interconnected with adjacent central chain lengths 2 in a similar manner. Three and three pairs of links 3 may for example be welded together simultaneously. Upon termination of the welding operations of the various pairs of links, the entire anti-skid device is hardened in any conventional, suitable manner.

FIG. VI shows a horizontal elevation of two interconnected horizontal links 3 on adjacent chain lengths 2 where for clarity, the remaining links 6, 3 are excluded. The two links 3 are welded together along their common line of contact 7. A gripping element 8 is rigidly fixed to the links 3 by means of welding. The gripping element 8 may for example be formed of a flat bar steel. It should be appreciated, however, that the gripping device may have any suitable profile and that the gripping element 8 not necessarily have to be arranged in a transverse position as shown on the Figure. It should further be appreciated that the gripping element may serve as a reinforcement of the interconnection between the two links.

What is claimed is:

1. An anti-skid device intended to be fitted on vehicle wheels for improving the traction of the wheel on the ground, comprising at least two chains which are intended to surround the tread face of the wheel and being arranged in an approximately zig-zag shaped formation along the circumference of the wheel, the at least two chains being interconnected and connected to support means intended to extend along the inner and outer walls of the tire for supporting the zig-zag shaped formation, the interconnection being provided by welding a certain number of neighbouring links of adjacent chains together.

2. An anti-skid device as claimed in claim 1, wherein the links are welded together along their straight, parallel portions.

3. An anti-skid device as claimed in claim 1, wherein the linear length of each chain exceeds the length of the circumference of the tire.

4. An anti-skid device as claimed in claim 1, wherein at least some of the links of each chain are provided with additional gripping elements, welded to the links.

5. An anti-skid device as claimed in claim 4, wherein additional gripping element is welded to two interconnected links in a transverse position.

6. An anti-skid device as claimed in claim 3, wherein the chains are given a length which is sufficient in order to achieve the required zig-zag pattern.

7. Method for producing an anti-skid device intended to be fitted on the wheels of a vehicle for improving the traction of the wheels on the ground, the anti-skid device comprising at least two chains which are intended to surround the tread face of the wheel and being arranged in an approximately zig-zag shaped formation along the circumference of the wheel, the chains being interconnected and connected to support means associated therewith, the support means being intended to extend along the inner and outer walls of the tire, the length of each chain being adjusted to the peripheral length of the wheel, whereafter the various chains are arranged in the designed pattern on an assembly jig whereafter a limited number of neighbouring links on adjacent chains are permanently interconnected by means of welding the links together along their common line of contact whereafter the entire anti-skid device is hardened in any conventional matter.

* * * * *